United States Patent
Macharia et al.

(10) Patent No.: US 9,098,093 B2
(45) Date of Patent: Aug. 4, 2015

(54) MODEL PREDICTIVE CONTROL OF BIOFUEL DENATURANT BLENDING

(75) Inventors: Maina A. Macharia, Round Rock, TX (US); Donald Melvin Maxwell, Scottsdale, AZ (US)

(73) Assignee: ROCKWELL AUTOMATION TECHNOLOGIES, INC., Mayfield Heights, OH (US)

(*) Notice: Subject to any disclaimer, the term of this patent is extended or adjusted under 35 U.S.C. 154(b) by 1456 days.

(21) Appl. No.: 12/242,606

(22) Filed: Sep. 30, 2008

(65) Prior Publication Data

US 2010/0082140 A1 Apr. 1, 2010

(51) Int. Cl.
G05D 11/02 (2006.01)
G05D 11/13 (2006.01)
G06Q 30/02 (2012.01)

(52) U.S. Cl.
CPC .......... G05D 11/135 (2013.01); G06Q 30/0283 (2013.01)

(58) Field of Classification Search
CPC ... G05D 11/135; G05D 11/139; G05D 11/00; C10L 10/04; C10L 10/06; C10L 10/14; C10L 1/1802; G06Q 30/0283
USPC ........ 700/266, 270–271; 800/295; 435/289.1; 44/269, 307
See application file for complete search history.

(56) References Cited

U.S. PATENT DOCUMENTS

| | | | |
|---|---|---|---|
| 3,379,421 A | 4/1968 | Putman | |
| 5,493,631 A * | 2/1996 | Huang et al. | 706/23 |
| 5,822,740 A * | 10/1998 | Haissig et al. | 706/3 |
| 6,496,781 B1 | 12/2002 | Chen et al. | |
| 6,532,454 B1 * | 3/2003 | Werbos | 706/14 |
| 2004/0033457 A1 | 2/2004 | Zhang et al. | |
| 2007/0078530 A1 | 4/2007 | Blevins et al. | |
| 2008/0028675 A1 | 2/2008 | Clifford et al. | |
| 2008/0047822 A1 * | 2/2008 | Ling | 203/19 |
| 2008/0103747 A1 | 5/2008 | Tay et al. | |
| 2008/0103748 A1 | 5/2008 | Axelrud et al. | |
| 2008/0104003 A1 | 5/2008 | Macharia et al. | |
| 2008/0108048 A1 | 5/2008 | Bartee et al. | |
| 2008/0109100 A1 | 5/2008 | Macharia et al. | |
| 2008/0109200 A1 | 5/2008 | Bartee et al. | |
| 2008/0167852 A1 | 7/2008 | Bartee et al. | |
| 2010/0082139 A1 | 4/2010 | Macharia et al. | |
| 2010/0082166 A1 | 4/2010 | Macharia et al. | |
| 2010/0082312 A1 | 4/2010 | Macharia et al. | |

FOREIGN PATENT DOCUMENTS

EP 0303345 A2 2/1989

* cited by examiner

*Primary Examiner* — Shogo Sasaki
(74) *Attorney, Agent, or Firm* — Fletcher Yoder P.C.

(57) ABSTRACT

The present invention provides novel techniques for controlling the blending of multiple fluids. In particular, the present techniques are presented in the context of biofuel production, wherein blending of a denaturant with an undenatured biofuel may be controlled and optimized. However, the present techniques may also be applied to any other suitable applications, such as the production of petroleum products, where multiple fluids may be blended.

15 Claims, 5 Drawing Sheets

MODEL PREDICTIVE CONTROL OF BIOFUEL DENATURANT BLENDING

BACKGROUND

The present invention relates generally to control systems, and more particularly to model predictive control employing novel techniques for optimizing the blending of denaturants with undenatured biofuels.

Many processing applications, such as biofuel production, include sub-processes where multiple fluids may be blended. For example fuel-grade ethanol (denatured) has industry specifications. These specifications include specific gravity, water mass percentage, ethanol percentage, sulfur content, and % hydrocarbon denaturant. Hydrocarbon denaturant is tested to an ASTM D-4806 standard and this hydrocarbon denaturant has a maximum and a minimum specification. Typical ranges for ASTM D-4806 are from 1.96-4.76 volume % of hydrocarbon. In addition, the water specification ASTM E-203 is less than 0.82 mass % of water.

The ASTM D-4806 standard is a specification in relation to anhydrous denatured fuel ethanol intended for blending with unleaded or leaded gasolines for use as a spark-ignition automotive engine fuel. The only denaturants allowed for fuel ethanol are natural gasoline, gasoline components, or unleaded gasoline at the minimum concentration prescribed. Gasoline and product ethanol prices are known to vary substantially in the market. The price spread between the two blend components is a variable which fuel grade ethanol manufacturers consider when denaturing fuel ethanol.

With water content being an allowable tolerance and the knowledge that higher water contents in fuel grade ethanol lower the cost of operation, blenders tend to run moisture at the specification limit (e.g., 0.82 mass % water). Producers may perform a blend calculation to ensure that the final blend meets ASTM D-4806 specifications and is within or at the ASTM E-203 limit to maximize blending profit. In other words the volume % blending of ethanol and gasoline parts may be done within the water mass % specification of the final fuel grade ethanol. This may be done off-line by most biofuels manufacturers by mathematical relationships of volumetric mixing rules of fluid mixtures. However with known measurements of desired water content and the cost of ethanol and gasoline, this may also be accomplished using model predictive control (MPC) techniques, integrating the blending requirements with the adjustment of operating targets of molecular sieve process units.

E-grade denatured fuel ethanol or a customer's specifications are required. One such process is the blending of denaturants with biofuels, which may be done in order to ensure that the biofuels are not fit for human consumption, thereby preventing people from drinking the biofuels. However, in many such applications, when controlling the blending of the multiple fluids, a fixed set point for the percentage of one fluid within another fluid (e.g., of a denaturant within a biofuel) may often be used. Therefore, blending of the multiple fluids may be performed in a constant manner based on this fixed set point, as opposed to dynamically optimizing the blending percentages of the fluids based upon final biofuel product specifications and the blending economics of the blending components.

BRIEF DESCRIPTION

The present invention provides novel techniques for controlling the blending of multiple fluids. In particular, the present techniques are presented in the context of biofuel production, wherein blending of a denaturant with an undenatured biofuel may be controlled and optimized. However, the present techniques may also be applied to any other suitable applications, such as the production of petroleum products, where multiple fluids may be blended.

In general, the present techniques provide a method for controlling the blending of a denaturant with a biofuel in a biofuel production process. The method includes determining a price of the denaturant and the biofuel. The method also includes determining an optimal blending percentage of the denaturant to be blended with the biofuel based upon the prices of the denaturant and the biofuel and other specification constraints that are impacted by the blending of ethanol and denaturant. The method further includes controlling the blending of the denaturant with the biofuel based to achieve the economic determined optimal blending percentage. In addition, the method may optionally include controlling a molecular sieve based upon the determined optimal blending percentage.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
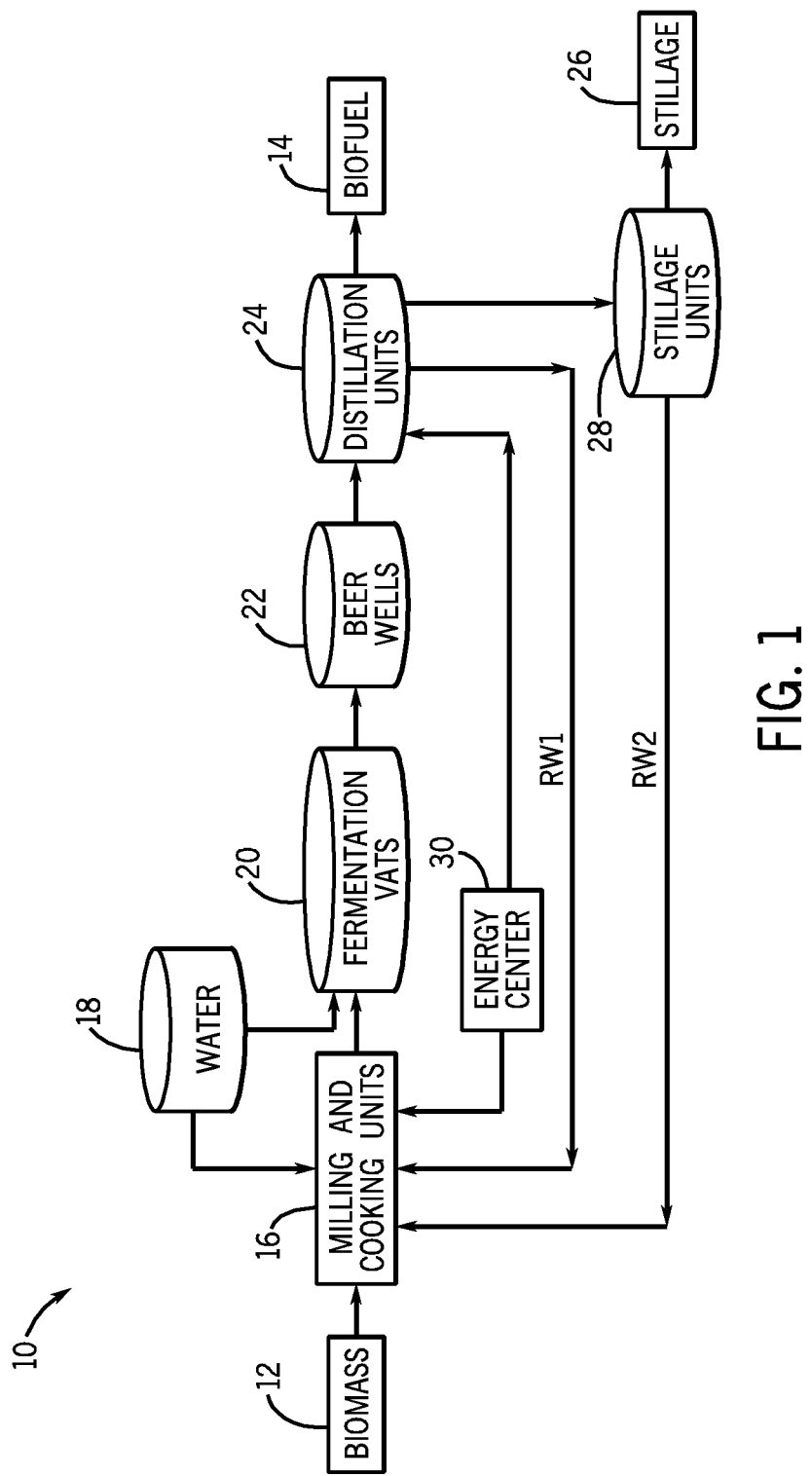
FIG. 1 is a diagram of an exemplary undenatured biofuel production plant.

Turning now to the drawings, FIG. 1 is a diagram of an exemplary undenatured biofuel production plant 10, illustrating how biomass 12 may be processed through several stages to produce biofuel 14. Biomass 12 may first be provided to a milling and cooking process, e.g., milling and cooking units 16, where water 18 (and possibly recycled water RW1 and RW2) may be added and the biomass 12 may be broken down to increase the surface area-to-volume ratio. This increase in surface area may allow for sufficient interaction of the water 18 and biomass 12 surface area to achieve a solution of fermentable sugars in water 18. The mixture, a biomass 12 and water 18 slurry, may be cooked to promote an increase in the amount of contact between the biomass 12 and water 18 in solution and to increase the separation of carbohydrate biomass from non-carbohydrate biomass. The output of the milling and cooking units 16 (i.e., the fermentation feed or mash) may then be sent to a fermentation process, where one or more fermentation vats 20 may operate to ferment the biomass/water mash produced by the milling and cooking units 16.

The fermentation process may require additional water 18 to control the consistency of material to the fermentation vats 20 (also referred to herein as a fermenter or fermentation tank). Biomass 12 may be converted by yeast and enzymes into a biofuel 14 and by-products such as carbon dioxide, water and non-fermentable biomass (solids), in the fermentation vats 20. The fermentation process is a batch process and may include multiple fermenters operating in parallel. The batch start times may be staggered in order to optimize the utilization of the capacity of the beer wells 22 and smoothly distribute the flow of fermentation feed to the fermentation process and the flow of biofuel 14 and stillage as output from the fermentation process.

After being temporarily stored in the beer wells 22, the output from the fermentation vats 20 may be sent to a distillation process, e.g., one or more distillation units 24, to separate biofuel 14 from water 18, carbon dioxide, and non-fermentable solids. If the biofuel 14 has to be dehydrated to moisture levels less than 5% by volume, the biofuel 14 may be processed through a processing unit called a molecular sieve or similar processing units (not shown). The finalized biofuel 14 may then be processed to ensure it is denatured and not used for human-consumption.

The distillation units 24 may separate the biofuel 14 from water 18. Water 18 may be used in the form of steam for heat and separation, and the condensed water may be recycled (RW1) back to the milling and cooking units 16. Stillage 26 (non-fermentable solids and yeast residue), the heaviest output of the distillation units 24, may be sent to stillage processing units 28 for further development of co-products from the biofuel 14 production process.

The stillage processing units 28 may separate additional water from the cake solids and recycle the water (RW2) back to the milling and cooking units 16. Several stillage processing options may be utilized, including: (1) selling the stillage with minimal processing and (2) further processing the stillage by separating moisture from the solid products via one or more centrifuge units (not shown). Using the centrifuge units, the non-fermentable solids may be transported to dryers (not shown) for further moisture removal. A portion of the stillage liquid (concentrate) may also be recycled back to the fermentation vats 20. However, the bulk of the flow may generally be sent to evaporator units (not shown), where more liquid may be separated from the liquid stream, causing the liquid stream to concentrate into syrup, while solid stillage may be sent to a drying process, e.g., using a drying unit or evaporator, to dry the solid stillage to a specified water content. The syrup may then be sent to a syrup tank (not shown). Syrup in inventory may be processed using a number of options. For instance, the syrup may be: (1) sprayed in dryers to achieve a specified color or moisture content, (2) added to the partially dried stillage product, or (3) sold as a separate liquid product. The evaporator units may have a water by-product stream that is recycled back to the milling and cooking units 16.

An energy center 30 may supply energy to many of the processing units, e.g., the milling and cooking units 16, the distillation units 24 and mole-sieve units, and the stillage processing units 28. The energy center 30 may constitute a thermal oxidizer unit and heat recovery steam generator (HRSG) that may destroy volatile organic compounds (VOCs) and provide steam to the evaporators, distillation units 24, cooking system units (e.g., in 16), and dehydration units. The energy center 30 may typically be the largest source of heat in a biofuel plant 10.

Figure 2:
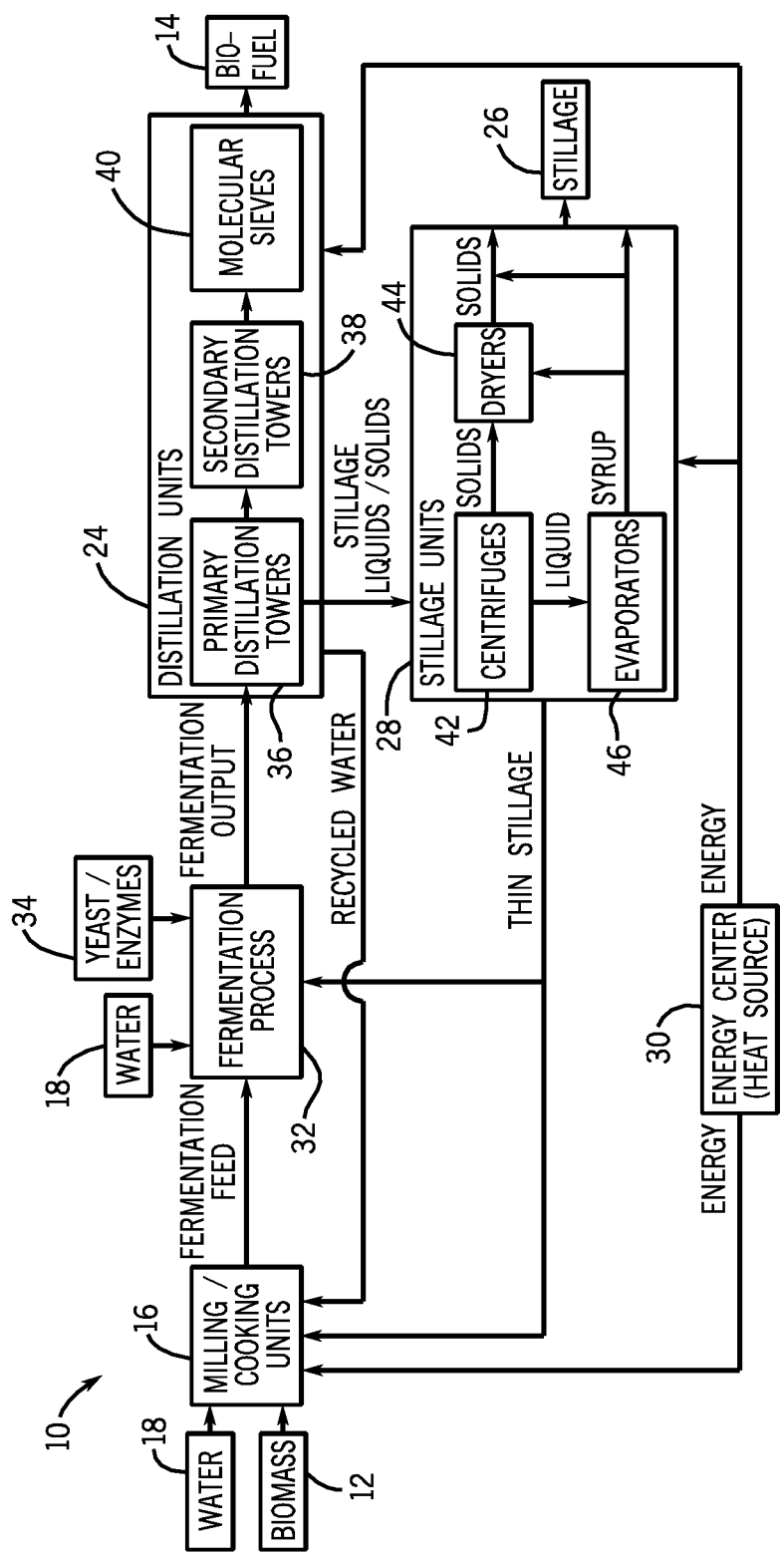
FIG. 2 is a more detailed process flow diagram of sub-processes of an exemplary undenatured biofuel production plant.

FIG. 2 is a more detailed process flow diagram of sub-processes of an exemplary undenatured biofuel production plant 10. It should be noted that the particular components, processes and sub-processes shown are merely meant to be exemplary and are not intended to be limiting. The milling and cooking units 16 may receive water 18, biomass 12, energy (electrical and/or thermal), recycled water, and/or recycled thin stillage, mill the biomass, cook the mixture, and output a biomass slurry (referred to as fermentation feed) to the fermentation process 32, which may include the fermentation vats 20 and beer wells 22 shown in FIG. 1. The fermentation process 32 may receive the biomass slurry, water 18, yeast and enzymes 34, and recycled thin stillage, ferment the mixture, and output fermentation products to the distillation units 24. The distillation units 24 may receive the fermentation products, remove water and stillage (liquid and solid stillage) from the fermentation products in a one- to three-step process (e.g., primary distillation towers 36, secondary distillation towers 38, and/or molecular sieves (dryers) 40), recycle water removed from the fermentation products to the milling and cooking units 16, output the liquid and solid stillage to the stillage processing units 28, and output biofuel 14. The stillage processing units 28 may receive the liquid and solid stillage, process the liquid and solid stillage (utilizing one or more of centrifuge dryers 42, other dryers 44, and/or evaporators 46) to produce and output various stillage 26, and recycle thin stillage liquid to the fermentation process 32 and the milling and cooking units 16. As in FIG. 1 above, the energy center 30 may provide electric power and heat (steam) to the various sub-processes as shown in FIG. 2.

The distillation units 24, which may include primary and secondary distillation towers 36 and 38, may receive the output of the fermentation process 32 (a mixture of biofuel, stillage, and water) and may separate the biofuel 14 from the water and stillage. Stillage may be removed from the primary distillation towers 36 and sent to the stillage processing units 28. Energy may be provided to the distillation units 24 from the energy center 30 and may be primarily used by one or more primary distillation towers 36. The energy may typically be delivered to the primary distillation towers 36 in the form of a steam flow through heat exchangers (not shown), but in some embodiments the steam flow may be added directly to the primary distillation towers 36. Energy may also be recycled to the distillation units 24 from other process flows or provided by other heat sources as needed or desired. The flashed overhead vapor from the primary distillation towers 36 may be transferred to one or more secondary distillation towers 38 (also referred to as the rectifier and side stripper columns). In the secondary distillation towers 38, energy may be provided by heat exchangers utilizing steam and/or heat recovery from other processes, such as the milling and cooking units 16 and/or the stillage processing units 28 utilizing energy recovery streams. The overhead vapor from the primary distillation towers 36 may be a high-purity biofuel (such as an ethanol/water mixture) which may be distilled close to its azeotropic point, but generally below fuel specification requirements. The bottom product stream of the secondary distillation towers 38 may be primarily condensed water. This condensed water may be recycled back to the milling and cooking units 16.

The overhead vapor from the primary distillation towers 36 and the secondary distillation towers 38 may be routed to inventory tanks (not shown) which may be used as surge reservoirs to regulate the feed flow rates between the distillation units and the one or more dehydration units. The dehydration units may be molecular sieve units 40 or other downstream dehydration processing units (e.g., extractive distillation). Molecular sieve units 40 may include an energy-efficient process unit which operates in gas phase using a dehydration process known as pressure swing adsorption (PSA). If the biofuel is ethanol, it may be dehydrated in either the liquid or gas phase. In certain embodiments, molecular sieve units 40 may absorb water in the biofuel vapor such that the resulting biofuel 14 may have only a trace amount of water. When the molecular sieve units 40 become saturated with water, they may be taken offline, replaced with a parallel regenerated unit, and then placed back online. The offline units may be regenerated under conditions that release moisture and allow the units to dry and be ready for future online use. PSA regeneration units may be adjusted to affect the efficiency and capacity of the molecular sieve units 40. The produced biofuel 14 may then be sent to final storage in product inventory tanks (not shown) and/or directed toward additional processing units.

Equipment for processing stillage may include one or more centrifuges 42, one or more evaporators 46, and zero, one, or more dryers 44. The one or more centrifuges 42 may receive a stillage feed (a mixture of liquid and solid stillage) from the bottom outputs of the primary distillation towers 36. The stillage feed from the primary distillation towers 36 may be routed to inventory tanks (not shown) which may be used as surge reservoirs to regulate the stillage feed flow rates between the primary distillation towers 36 and the centrifuges 42. The one or more centrifuges 42 may separate liquids from the stillage feed, output the thin stillage liquids, and output the remaining solids (dewatered stillage, also referred to as wet cake). The solids (including moisture and non-fermentable solids) may be sent to the dryers 44. Part of the thin stillage liquids may be recycled back to the fermentation process 32 and/or the milling and cooking units 16 and the balance may be sent to the one or more evaporators 46 to evaporate moisture from the liquids to form concentrated syrup. The syrup may be sent to a syrup inventory unit (not shown) before being combined with the dewatered stillage in the dryers 44, combined with the dried stillage output from the dryers 44, and/or sold as a stand-alone product. The stillage sub-process equipment may also include various heaters (not shown) and combustors (not shown) for the destruction of volatile organic compounds in the vapors from the drying stillage in the one or more evaporators 46 or dryers 44.

One or more of the processes described above may be managed and controlled via model predictive control utilizing a dynamic multivariate predictive model that may be incorporated as a process model in a dynamic predictive model-based controller. Model predictive control of sub-processes in a biofuel production process is described in greater detail below. In particular, various systems and methods are provided for using model predictive control to improve the yield, throughput, energy efficiency, and so forth of biofuel sub-processes in accordance with specified objectives. These objectives may be set and various portions of the processes controlled continuously to provide real-time control of the production process. The control actions may be subject to or limited by plant and external constraints.

Each of the illustrated sub-processes may operate within the larger biofuel production process to convert biomass 12 to biofuel 14 and possibly one or more co-products. Thus, the biofuel production plant 10 may typically include four general plant sections: milling/cooking, fermentation, distillation/sieves, and stillage processing. Each of these sub-processes may be at least partially dependent upon operation of one or more of the other sub-processes. Moreover, operating conditions that may be optimal for one sub-process may entail or cause inefficiencies in one or more of the other sub-processes. Thus, a plant bottleneck, meaning a local limitation that limits or restricts a global process, may occur in any of the above four sub-processes, thus limiting the overall operation of the biofuel production plant 10.

Thus, an operating challenge for biofuel production is to manage the various sub-processes, and possibly the entire system or process, to automatically respond to a constraint or disruption in the production system or process. As described in greater detail below, integrated model predictive control may be used to manage the biofuel production process in a substantially optimal manner, balancing various, and possibly competing, objectives of the sub-processes to approach, meet, and/or maintain objectives for the overall process. More specifically, the disclosed embodiments of model predictive control may be used to manage the blending of denaturants with undenatured biofuels.

The control of these sub-processes may be performed manually, e.g., based on decisions of a human operator, or may only be locally automated, e.g., via proportional-integral-derivative (PID) inventory controls of fermentation inventory and fermentation feed inventory. However, given the complexity of the relationships among the many factors or variables, such manual control generally results in significant inefficiencies, sub-optimal yields, etc.

Figure 3:
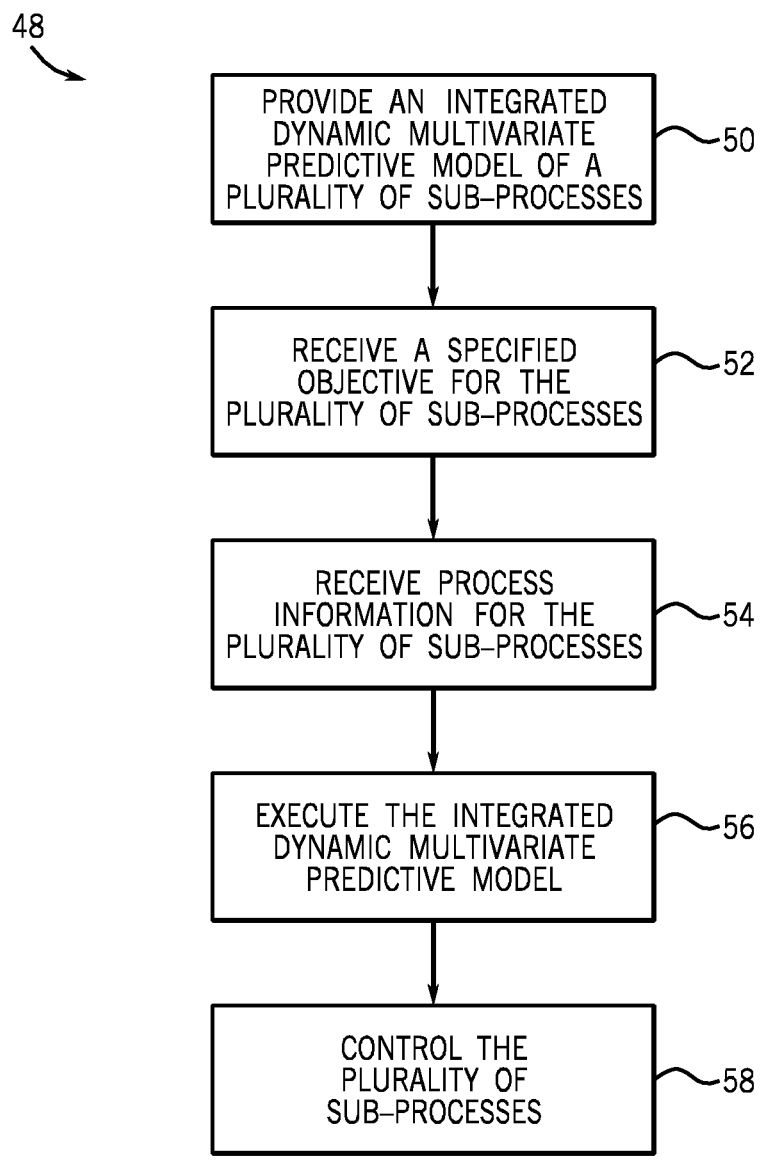
FIG. 3 is a flowchart of an exemplary method for integrated model predictive control of an undenatured biofuel production process.

FIG. 3 is a flowchart of an exemplary method 48 for such integrated model predictive control of an undenatured biofuel production process. More specifically, embodiments of the method 48 may apply model predictive control techniques to manage multiple sub-processes of the biofuel production process in an integrated manner. Note that in various embodiments, many of the method steps may be performed concurrently, in a different order than shown, or may be omitted. Additional method steps may also be performed.

In step 50, an integrated dynamic multivariate predictive model representing a plurality of sub-processes of the biofuel production process may be provided. In other words, a model may be provided that specifies or represents relationships between attributes or variables related to the sub-processes, including relationships between inputs to the sub-processes and resulting outputs of the sub-processes.

The model may be of any of a variety of types. For example, the model may be linear or nonlinear, although for most complex processes, a nonlinear model may be preferred. Other model types contemplated include fundamental or analytical models (i.e., functional physics-based models), empirical models (such as neural networks or support vector machines), rule-based models, statistical models, standard model predictive control models (i.e., fitted models generated by functional fit of data), or hybrid models using any combination of the above models.

The integrated dynamic multivariate predictive model may include a set of mathematical relationships that includes steady state relationships and may also include the time lag relationship for each parameter change to be realized in the output. A great variety of dynamic relationships may be possible and each relationship between variables may characterize or capture how one variable may affect another and also how fast the effects may occur or how soon an effect may be observed at another location.

The integrated dynamic multivariate predictive model may be created from a combination of relationships based on available data such as fundamental dynamic and gain relationships, available plant historic process data, and supplementary plant testing on variables that may not be identified from the two previous steps. Models may be customized to the plant layout and design, critical inventories, plant constraints and measurements, and controllers available to manage variables. Moreover, in some embodiments, external factors, such as economic or regulatory factors, may be included or represented in the model.

An important characteristic of the integrated dynamic multivariate predictive model may be to identify when a control variable changes as a result of a change in one or more manipulated variables. In other words, the model may identify the time-response (e.g., time lag) of one or more attributes of a sub-process with respect to changes in manipulated variables. For example, once a controller adjusts pump speeds, there may be a certain time-dependent response before observing an effect at a tank being filled. This time-dependent response may be unique for each independent controller. For instance, flow rates may vary because of differences in system variables (e.g., piping lengths, tank volumes, and so forth) between the control actuator and sensor and the pump location.

In certain embodiments, the integrated dynamic multivariate predictive model may include inferential models (also referred to as property approximators or virtual online analyzers (VOAs)). An inferential model may be a computer-based model which calculates inferred quality properties from one or more inputs of other measured properties (e.g., process stream or process unit temperatures, flows, pressures, concentrations, levels, and so forth). In certain embodiments, the integrated dynamic multivariate predictive model may be subdivided into different portions and stored in a plurality of memories. The memories may be situated in different locations of the biofuel production plant 10. The controller may communicate with the memories utilizing a communication system.

In step 52, a specified objective for the plurality of sub-processes may be received. The objective may specify a desired behavior or outcome of the biofuel production process. In certain embodiments, the objective may be somewhat complex or compound. For example, the objective may include a global objective and a plurality of sub-objectives directed to at least a subset of the plurality of sub-processes. In other words, the specified objective may include an overall objective for the biofuel production process, e.g., maximize throughput, efficiency, and so forth, and may also include various subsidiary objectives related specifically to the respective sub-processes. In addition, the sub-objectives may be mutually exclusive or competitive with respect to each other and/or with respect to the global objective.

Exemplary objectives may include, but are not limited to, one or more operator specified objectives, one or more predictive model specified objectives, one or more programmable objectives, one or more target feed rates, one or more cost objectives, one or more quality objectives, one or more equipment maintenance objectives, one or more equipment repair objectives, one or more equipment replacement objectives, one or more economic objectives, one or more target throughputs for the biofuel production process, one or more objectives in response to emergency occurrences, one or more dynamic changes in materials inventory information, one or more dynamic changes in available process energy constraints, or one or more dynamic changes in one or more constraints on the biofuel production process, and so forth. In particular, in certain embodiments, a specific objective may include the optimization of denaturant blending with undenatured biofuel in the distillation sub-process of the biofuel production process.

In step 54, process information related to the plurality of sub-processes may be received from the biofuel production process. This process information may be any type of process information, including state or condition information measured by sensors (e.g., temperatures, pressures, real-time measurements of the biofuel in the fermentation system, and so forth), computed algorithmically, inferred from models (i.e., inferential models), taken from lab values, entered by operators, and so forth. The process information may further include equipment settings, flow rates, material properties (e.g. densities), content profiles, purity levels, ambient conditions (e.g., time of day, temperature, pressure, humidity, and so forth), economic or market conditions (e.g., cost of materials or product), and so forth. In other words, the process information may include any information that affects or influences any part of the biofuel production process.

More specifically, the process information may include measurements of one or more control variables and one or more manipulated variables related to the sub-processes and one or more variables of other processes that may impact the sub-processes, as well as information from inferential models, laboratory results, and so forth. The process information may be communicated to the controller from a distributed control system.

In step 56, the integrated dynamic multivariate predictive model may be executed in accordance with the objective using the received process information as input, thereby generating model output comprising target values of one or more controlled variables related to one or more of the plurality of sub-processes in accordance with the objective. In other words, the model may be executed to determine target values for manipulated variables for one or more of the sub-processes that may be used to control the sub-processes in such a way as to attempt to meet the specified objective.

For example, in an embodiment where the objective is to optimize denaturant blending for the sub-process, the model may determine various target values (e.g., sub-process material input flows, temperatures, pressures, and so forth) that may operate to optimize the denaturant blending. As another example, in an embodiment where the objective is to minimize costs for a sub-process, the model may determine target values that may operate to minimize costs for the sub-process, possibly at the expense of denaturant blending. In a further example, the objective may be to maximize profit for the entire production process, where optimizing denaturant blending and minimizing costs may be two, possibly competing, sub-objectives, e.g., included in the objective.

It should be noted that as used herein, the terms "maximum," "minimum," and "optimum," may refer respectively to "substantially maximum," "substantially minimum," and "substantially optimum," where "substantially" indicates a value that is within some acceptable tolerance of the theoretical extremum, optimum, or target value. For example, in one embodiment, "substantially" may indicate a value within 10% of the theoretical value. In another embodiment, "substantially" may indicate a value within 5% of the theoretical value. In a further embodiment, "substantially" may indicate a value within 2% of the theoretical value. In yet another embodiment, "substantially" may indicate a value within 1% of the theoretical value. In other words, in all actual cases (non-theoretical), there are physical limitations of the final and intermediate control element, dynamic limitations to the acceptable time frequency for stable control, or fundamental limitations based on currently understood chemical and physical relationships. Within these limitations, the control system will generally attempt to achieve optimum operation, i.e., operate at a targeted value or constraint (maximum or minimum) as closely as possible.

In step 58, the plurality of sub-processes of the biofuel production process may be controlled in accordance with the target values and the objective. In other words, a controller (or a plurality of controllers) may modulate or otherwise control various operational aspects of the sub-processes in accordance with the target values of the manipulated variables. In some embodiments, the target values may simply be used as set points by the controller. In other words, the controller may set respective inputs of the various sub-processes to the respective target values. For example, controlling the plurality of sub-processes of the biofuel production process in accordance with the target values and the objective may include operating one or more controllers to control one or more of the following: one or more material feed rates, one or more water flows, one or more molecular sieve regenerations, one or more heat sources, and so forth.

Steps 52, 54, 56, and 58 of the method 48 may be performed a plurality of times in an iterative manner to operate the biofuel production process in a substantially optimal fashion. In other words, the method 48 described above may be performed substantially continuously, such as at a specified frequency, providing control of the biofuel production process in substantially real time to optimize the biofuel production process with respect to the specified objective.

In embodiments where multiple objectives may be provided, possibly at odds with one another, an optimizer may be used to balance the various sub-objectives in attempting to meet the global objective. In other words, an optimizer may be used to determine how to compromise with respect to the various sub-objectives in attempting to achieve the global objective. Thus, in certain embodiments, executing the integrated dynamic multivariate predictive model may include an optimizer executing the integrated dynamic multivariate predictive model to generate the model output. The generated model output may include the target values of one or more variables related to one or more of the plurality of sub-processes in accordance with the global objective and the plurality of sub-objectives. In certain embodiments, the optimizer may execute the integrated dynamic multivariate predictive model a plurality of times in an iterative manner. For example, the optimizer may repeatedly execute the model using various inputs and compare the resulting outputs to the specified objective (including the sub-objectives), thereby searching the solution space for input configurations that optimize the outcome, e.g., that allow the global objective to be met or at least approached, while minimizing the compromises made with respect to the various sub-objectives.

In certain embodiments, the method 48 may further include receiving constraint information specifying one or more constraints, such as limitations on one or more aspects or variables of the biofuel production process. The optimizer may execute the integrated dynamic multivariate predictive model in accordance with the objective using the received process information and the one or more constraints as input, thereby generating the model output in accordance with the objective and subject to the one or more constraints. The one or more constraints may include any such limitation on the biofuel production process including, but not limited to, one or more of: batch constraints (e.g., fermentation time), water constraints, feed constraints, equipment constraints, capacity constraints, temperature constraints, pressure constraints, energy constraints, market constraints, economic constraints, environmental constraints, legal constraints, operator-imposed constraints, and so forth. Furthermore, examples of equipment constraints may include, but are not limited to, one or more of: operating limits for pumps, operational status of pumps, tank capacities, operating limits for tank pressures, operational status of tanks, operating limits for valve pressures, operating limits for valve temperatures, operating limits for pipe pressures, operating limits for energy provision, operating limits for molecular sieves, and so forth. Moreover, in certain embodiments, the constraint information may include dynamic constraint information. In other words, some of the constraints may change dynamically over time. Therefore, the method 48 may automatically adjust operations taking into account these changing constraints.

In certain embodiments, the system may derive its measurements or process information from the process instruments or sensors, inferential models, real-time measurements of the biofuel in the fermentation system, and/or lab values, and execute linear or non-linear dynamic prediction models to solve an overall optimization objective which may typically be an economic objective function subject to dynamic constraints of the plant processes. The system may then execute the integrated dynamic multivariate predictive model, controller, and optimizer in accordance with the objective, e.g., the optimization function. For instance, the system may optimize denaturant blending with the undenatured biofuel in the distillation sub-process.

Figure 4:
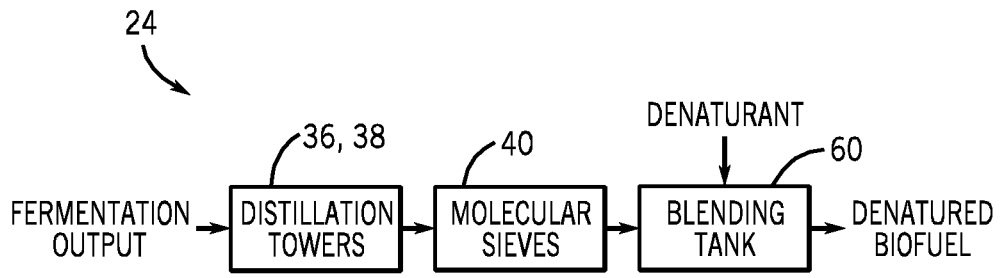
FIG. 4 is a process flow diagram of an exemplary distillation sub-process, including denaturant blending, of the distillation units of FIG. 2.

FIG. 4 is a process flow diagram of an exemplary distillation sub-process, including denaturant blending, of the distillation units 24 of FIG. 2. As illustrated in FIG. 4 and discussed in greater detail above, fermentation output from the fermentation process 32 of FIG. 2 may be directed into the distillation towers 36, 38 (e.g., beer columns, rectifier columns, side stripper columns, and so forth). Within the distillation towers 36, 38, energy sources (e.g., steam) may be used to remove water (as well as stillage) from the fermentation product, thereby producing a high-purity undenatured biofuel. From the distillation towers 36, 38, the high-purity undenatured biofuel may be directed into the molecular sieves 40, where additional energy sources may be used to further remove water. From the molecular sieves 40, the undenatured biofuel product may be directed into a blending tank 60 where a denaturant may be added to (i.e., blended with) the biofuel to create a denatured biofuel.

A general purpose of denaturing biofuels is to ensure that the biofuels are not fit for human consumption, thereby preventing people from drinking the biofuels. Indeed, the United States federal government, as well as other national and local governments, regulates the minimum and maximum denaturant blending percentages that can and should be present in biofuels. For instance, an exemplary denaturant blending specification may mandate minimum and maximum denaturant blending percentages of 1.96% and 4.76% percent, respectively. In other words, the denaturant may constitute between 1.96% and 4.76% of the total blended volume of undenatured biofuel (e.g., ethanol) and denaturant. Myriad additives may be used as denaturants, such as gasoline. However, since government regulations may mandate only a range of allowable denaturant blending ratios, even after determining which denaturant will be used, operators of biofuel production processes may still decide how much denaturant to blend with the undenatured biofuel.

Figure 5:
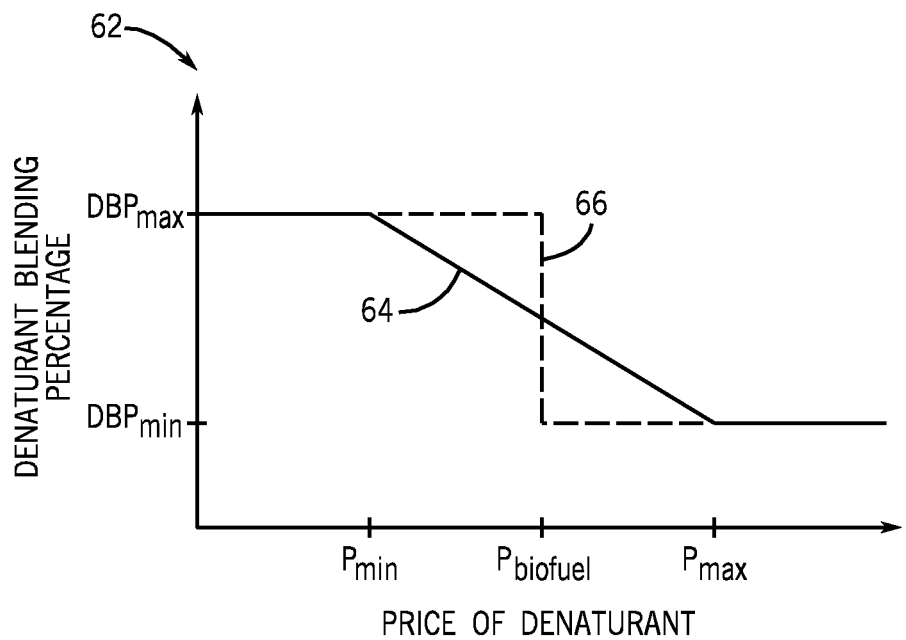
FIG. 5 is an exemplary chart of denaturant blending percentage versus denaturant price.

The current price of the denaturant may be one variable used to determine the amount of denaturant to blend with the undenatured biofuel. For example, FIG. 5 is an exemplary chart 62 of denaturant blending percentage versus denaturant price. As illustrated by line 64, as the price of denaturant increases from, for instance, a minimum price $P_{min}$ to a maximum price $P_{max}$, the selected denaturant blending percentage may decrease from a maximum denaturant blending percentage $DBP_{max}$ (e.g., 4.2%) to a minimum denaturant blending percentage $DBP_{min}$ (e.g., 2.0%). Conversely, as the price of denaturant decreases from, for instance, a maximum price $P_{max}$ to a minimum price $P_{min}$, the selected denaturant blending percentage may increase from a minimum denaturant blending percentage $DBP_{min}$ to a maximum denaturant blending percentage $DBP_{max}$. However, these denaturant price-blending relationships are merely exemplary and not intended to be limiting. For instance, there may not actually be "minimum" or "maximum" price of the denaturant. Rather, the "minimum" and "maximum" prices illustrated in the chart 62 may simply be the prices corresponding to the limits of the minimum denaturant blending percentage $DBP_{min}$ and the maximum denaturant blending percentage $DBP_{max}$.

Moreover, the relationship between denaturant price and blending percentages may not be characterized by a linear relationship. Indeed, the relationship between the price of the denaturant and the selected denaturant blending percentage may be a step-wise relationship based on the relative price of the denaturant to the price of the undenatured biofuel being produced. For instance, as illustrated by line 66, when the price of the denaturant is greater than the price of the produced biofuel $P_{biofuel}$, a decision may be made to use the minimum denaturant blending percentage $DBP_{min}$. Conversely, when the price of the denaturant is less than the price of the produced biofuel $P_{biofuel}$, a decision may be made to use the maximum denaturant blending percentage $DBP_{max}$. Again, as described above, these denaturant price-blending relationships are merely exemplary and not intended to be limiting. Indeed, the denaturant blending percentage may be selected based on current prices of the denaturant and undenatured biofuel as well as myriad other variables, such as the operating variables of the biofuel production process described in greater detail above.

Figure 6:
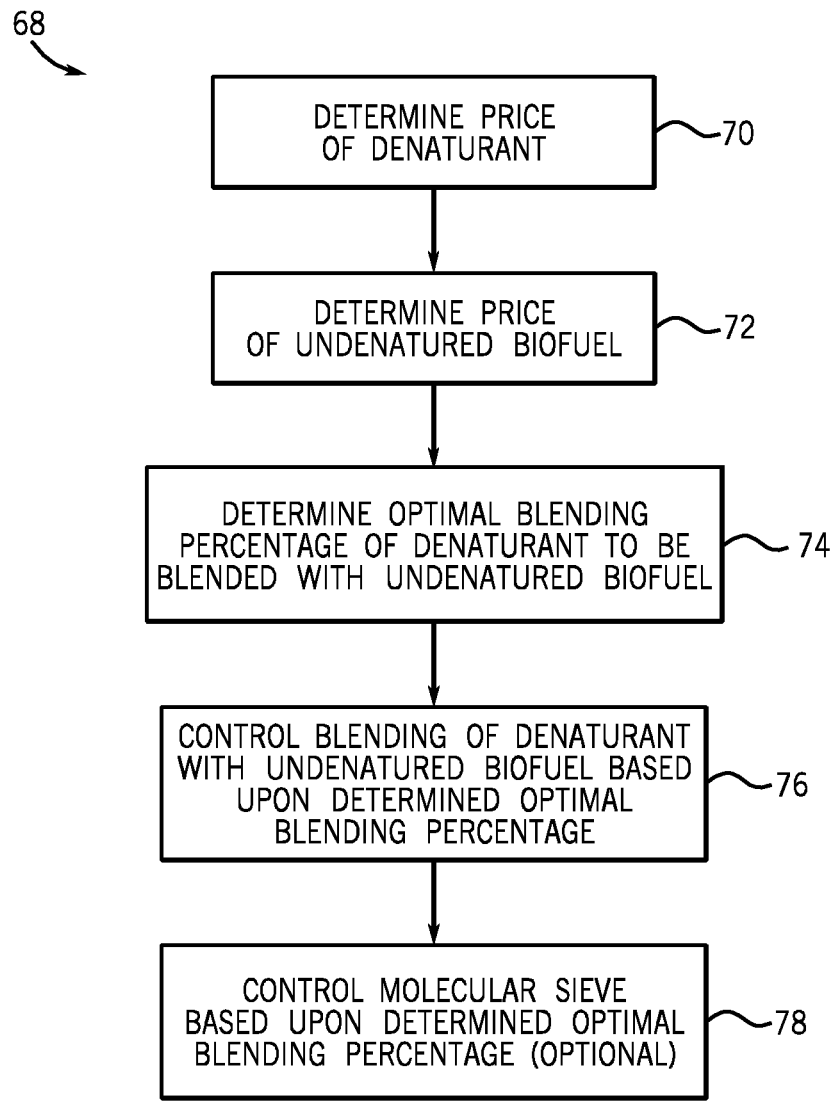
FIG. 6 is a flow chart of an exemplary method for controlling the blending of a denaturant with an undenatured biofuel using components of the distillation units illustrated in FIG. 4.

Using the model predictive control techniques discussed in greater detail above, it may be possible to monitor, control, and optimize the sub-processes (in particular, the distillation and denaturant blending sub-processes) of the biofuel production process in order to implement optimized decisions regarding the blending of a denaturant with undenatured biofuel. For instance, FIG. 6 is a flow chart of an exemplary method 68 for controlling the blending of a denaturant with an undenatured biofuel using components of the distillation units 24 illustrated in FIG. 4. The method 68 may be integrated into the model predictive control method 48 of FIG. 3 above. Indeed, the method 68 may be one exemplary embodiment of the predictive model techniques discussed above.

In step 70, a price of the denaturant may be determined. Similarly, in step 72, a price of the undenatured biofuel may be determined. In steps 70 and 72, the prices for the denaturant and the undenatured biofuel may be determined in various ways. For instance, prices of the denaturant and the undenatured biofuel may be based upon market price data, obtained from publicly-available sources. Alternatively, actual cost data may be used to determine the prices of the denaturant and the undenatured biofuel. For instance, with respect to the undenatured biofuel, the cost of production of the undenatured biofuel within the biofuel production plant 10 may be used as a proxy for the price of the undenatured biofuel. In addition, with respect to the denaturant, the price actually spent to buy the inventory of the denaturant may be used, incorporating any appropriate accounting principles regarding the cost of the denaturant inventory (e.g., last-in-first-out (LIFO), first-in-first-out (FIFO), and so forth).

In step 74, an optimal blending percentage of denaturant to be blended with the undenatured biofuel may be determined based upon the prices of the denaturant and the undenatured biofuel, determined in steps 70 and 72. This determination of optimal blending percentage may take into account the model predictive control and optimization techniques discussed in greater detail above. For instance, the predictive model controller may be executed to generate model outputs which may be optimized to determine the optimal blending percentage of denaturant to be blended with the undenatured biofuel.

Again, as discussed above, the optimal blending percentage may be determined based upon other variables in addition to the prices of the denaturant and the undenatured biofuel. For instance, the optimal blending percentage may be determined based upon various operating variables, discussed above, of the distillation units 24 (e.g., the primary distillation towers 36, the secondary distillation towers 38, the molecular sieves 40, the blending tank 60, and so forth) of the biofuel production plant 10. Indeed, the optimal blending percentage may be determined based upon any variables, discussed above, related to any of the sub-processes (e.g., the milling and cooking units 16, the fermentation process 32, the distillation units 24, the stillage processing units 28, and so forth) of the biofuel production plant 10. As discussed above, the determined optimal blending percentage may be equal to or less than an allowable moisture content. In addition, the determined optimal blending percentage may fall between a minimum and maximum allowable denaturant volume for the final produced biofuel product.

In step 76, the blending of the denaturant with the undenatured biofuel may be controlled based upon the optimal blending percentage, determined in step 74. The control of the blending of the denaturant with the undenatured biofuel may include manipulation of any number of the process variables described above. For example, control of the blending of the denaturant with the undenatured biofuel may include control of the feed rate of the denaturant into the blending tank 60 of FIG. 4 by, for instance, manipulating control valves fluidly connected to piping leading into the blending tank 60.

In step 78, the molecular sieves 40 of FIGS. 2 and 4 may optionally be controlled based upon the optimal blending percentage, determined in step 74. For example, if a decision is made to blend a greater amount of denaturant with the undenatured biofuel, the molecular sieves 40 may be operated at a higher target. For instance, the molecular sieves 40 may be allowed to operate such that higher moisture levels are produced in the undenatured biofuel. In other words, the denaturant blending agent may allow for even more moisture in the undenatured biofuel. Other variables of the molecular sieves 40 which may be controlled based upon the optimal blending percentage may include, but are not limited to, the flow rates of undenatured biofuel into the molecular sieves 40, the pressure in the molecular sieves 40, the temperature and flow rates of steam used within the molecular sieves 40, and so forth.

In addition, control actions taken in step 78 may be based upon control actions taken in step 76. In other words, manipulated variables of the molecular sieves 40 may be directly controlled based upon the control of the denaturant blending in the blending tank 60. More specifically, as changes occur in the denaturant blending sub-process, concurrent changes may occur in the molecular sieves 40. For instance, if in step 74, the optimal blending percentage is determined to be greater than the current blending percentage, the denaturant blending percentage may be increased in the blending tank 60. The process controller may take this increase into account and determine that the molecular sieves 40 may be operated at a different moisture target and may control the operation of the molecular sieves 40 accordingly.

The steps 70, 72, 74, 76, and 78 of the method 68 may be cyclically repeated during the biofuel production process. In addition, the steps 70, 72, 74, 76, and 78 of the method 68 may be performed sequentially, simultaneously, or in any order relative to one another.

The control systems used to implement the present techniques may be open or closed. Open loop systems are only defined by the inputs and the inherent characteristics of the system or process. In the biofuel production process, the system may be the entire biofuel production plant, one sub-process of the biofuel production plant, such as the milling and cooking units 16, or control of a variable in a process such as the temperature of the milling and cooking units 16. In a closed loop system, the inputs may be adjusted to compensate for changes in the output where, for example, these changes may be a deviation from desired or targeted measurements. A closed loop system may sense a change and provide a feedback signal to a process input. Process units in the biofuel production system may be closed loop systems if they need to be regulated subject to constraints such as product quality, energy costs, process unit capacity, and so forth. Traditional PID controllers and other control systems such as ratio controls, feed-forward controls, and process models may be used to control biofuel production processes. A distributed control system may have many control schemes set up to control the process unit variables at the local control level.

The control systems may include a computer system with one or more processors, and may include or be coupled to at least one memory medium (which may include a plurality of memory media), where the memory medium may store program instructions according to the present techniques. In various embodiments, controllers may be implemented on a single computer system communicatively coupled to the biofuel production plant 10, or may be distributed across two or more computer systems, e.g., that may be situated at more than one location. In this embodiment, the multiple computer systems comprising the controllers may be connected via a bus or communication network.

The automated control system for the biofuel production plant 10 may include one or more computer systems which interact with the biofuel production plant 10 being controlled. The computer systems may represent any of various types of computer systems or networks of computer systems which execute software programs according to various embodiments of the present techniques. The computer systems may store (and execute) software for managing sub-processes in the biofuel production plant 10. The software programs may perform various aspects of modeling, prediction, optimization and/or control of the sub-processes. Thus, the automated control system may implement predictive model control of the sub-processes in the biofuel production plant 10. The system may further provide an environment for making optimal decisions using an optimization solver (i.e., an optimizer) and carrying out those decisions (e.g., to control the plant).

One or more software programs that perform modeling, prediction, optimization and/or control of the biofuel production plant 10 may be included in the computer systems. Thus, the systems may provide an environment for a scheduling process of programmatically retrieving process information relevant to the sub-processes of the biofuel production plant 10, and generating actions to control the sub-processes, and possibly other processes and aspects of the biofuel production plant 10.

The computer systems may preferably include a memory medium on which computer programs according to the present techniques may be stored. The term "memory medium" is intended to include various types of memory or storage, including an installation medium (e.g., a CD-ROM or floppy disks), a computer system memory or random access memory (e.g., DRAM, SRAM, and so forth), or a non-volatile memory such as a magnetic medium (e.g., a hard drive or optical storage). The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution.

Also, the computer systems may take various forms, including a personal computer system, mainframe computer system, workstation, network appliance, Internet appliance or other device. In general, the term "computer system" may be broadly defined to encompass any device (or collection of devices) having a processor (or processors) which executes instructions from a memory medium. The memory medium (which may include a plurality of memory media) may preferably store one or more software programs for performing various aspects of model predictive control and optimization. A CPU, such as the host CPU, executing code and data from the memory medium may include a means for creating and executing the software programs.

The present techniques have been presented in the context of optimizing the blending of a denaturant with an undenatured biofuel. However, the present techniques may also be applied to any other systems where multiple fluids may be blended and where an optimization (e.g., an economic optimization) of the blending percentages between the fluids may prove beneficial. For instance, the processing of petroleum products may be another application where the present techniques may be used. Multiple petroleum products may be blended together in various combinations to produce different petroleum products (e.g., producing gasolines with varying octane ratings). Since the various petroleum products may be blended within certain ranges in order to meet specifications, it may be advantageous to blend the petroleum products based upon relative prices of the blended petroleum products.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling the blending of a denaturant with an undenatured biofuel in a biofuel production process, comprising:
   (a) producing an undenatured biofuel;
   (b) determining, using a process controller, a price of a denaturant;
   (c) determining, using the process controller, a price of the undenatured biofuel;
   (d) determining, using the process controller, an optimal blending percentage of the denaturant to be blended with the undenatured biofuel based upon the prices of the denaturant and the undenatured biofuel, wherein the determined optimal blending percentage of the denaturant is between a minimum and maximum allowable percentage of denaturant for a final biofuel product produced by the biofuel production process, wherein determining the optimal blending percentage of the denaturant comprises:
      deriving measurements from process instruments of the biofuel production process, utilizing inferential models of the biofuel production process, using laboratory values relating to operating variables of the biofuel production process and obtained from the biofuel production process, or a combination thereof, wherein the derived measurements, information from the inferential models, and the laboratory values comprise process information relating to the biofuel production process including equipment settings, temperatures, pressures, flow rates, material properties, ambient conditions, or a combination thereof; and executing linear or nonlinear prediction models, using the prices of the denaturant and the undenatured biofuel and the derived measurements, information from the inferential models, or the laboratory values as inputs, to obtain an overall optimization objective subject to dynamic constraints, wherein the overall optimization objective specifies the optimal blending percentage of the denaturant; and (e) controlling, using the process controller, the blending of the denaturant with the undenatured biofuel based upon the determined optimal blending percentage of the denaturant.

2. The method of claim 1, comprising:

(f) controlling operating parameters of the biofuel production process related to a molecular sieve based upon the determined optimal blending percentage of the denaturant to reduce an amount of water in the final biofuel product, wherein the molecular sieve removes moisture content from the undenatured biofuel prior to the blending of the denaturant with the undenatured biofuel, and wherein the operating parameters of the molecular sieve comprise flow rates of the undenatured biofuel into the molecular sieve, pressure in the molecular sieve, temperature or flow rates of steam used within the molecular sieve, or a combination thereof.

3. The method of claim 2, wherein the control actions taken in step (f) are based upon the control actions taken in step (e).

4. The method of claim 1, comprising using market price data to determine the price of the denaturant and/or the price of the undenatured biofuel.

5. The method of claim 1, comprising using cost data to determine the price of the denaturant and/or the price of the undenatured biofuel.

6. The method of claim 1, comprising determining the optimal blending percentage of the denaturant to be blended with the undenatured biofuel based upon operating variables of distillation units of the biofuel production process.

7. The method of claim 1, comprising cyclically repeating steps (b)-(e) during operation of the biofuel production process.

8. The method of claim 1, wherein steps (b)-(e) are performed sequentially or performed simultaneously.

9. A non-transitory computer readable medium, comprising:

computer code disposed on the non-transitory computer readable medium, wherein the code comprises instructions for controlling the blending of a denaturant with an undenatured biofuel in a biofuel production process, the instructions comprising:

instructions for determining an optimal blending percentage of the denaturant to be blended with the undenatured biofuel based upon prices of the denaturant and the undenatured biofuel, wherein the determined optimal blending percentage of the denaturant is between a minimum and maximum allowable percentage of denaturant for a final biofuel product produced by the biofuel production process, wherein the instructions for determining the optimal blending percentage of the denaturant comprise:

instructions for deriving measurements from process instruments of the biofuel production process, utilizing inferential models of the biofuel production process, using laboratory values relating to operating variables of the biofuel production process and obtained from the biofuel production process, or a combination thereof, wherein the derived measurements, information from the inferential models, and the laboratory values comprise process information relating to the biofuel production process including equipment settings, temperatures, pressures, flow rates, material properties, ambient conditions, or a combination thereof; and instructions for executing linear or nonlinear prediction models, using the prices of the denaturant and the undenatured biofuel and the derived measurements, information from the inferential models, or the laboratory values as inputs, to obtain an overall optimization objective subject to dynamic constraints, wherein the overall optimization objective specifies the optimal blending percentage of the denaturant; and instructions for controlling the blending of the denaturant with the undenatured biofuel based upon the determined optimal blending percentage of the denaturant.

10. The non-transitory computer readable medium of claim 9, comprising instructions for controlling operating parameters of the biofuel production process related to a molecular sieve based upon the determined optimal blending percentage of the denaturant to reduce an amount of water in the final biofuel product, wherein the molecular sieve removes moisture content from the undenatured biofuel prior to the blending of the denaturant with the undenatured biofuel, and wherein the operating parameters of the molecular sieve comprise flow rates of the undenatured biofuel into the molecular sieve, pressure in the molecular sieve, temperature or flow rates of steam used within the molecular sieve, or a combination thereof.

11. The non-transitory computer readable medium of claim 9, wherein the instructions are cyclically repeated during operation of the biofuel production process.

12. A process controller for controlling the blending of a denaturant with an undenatured biofuel in a biofuel production process, comprising:

a non-transitory computer readable medium comprising computer code disposed on the non-transitory computer readable medium, wherein the code comprises instructions for controlling the blending of a denaturant with an undenatured biofuel in a biofuel production process, the instructions comprising:

instructions for determining an optimal blending percentage of the denaturant to be blended with the undenatured biofuel based upon the prices of the denaturant and the undenatured biofuel, wherein the determined optimal blending percentage of the denaturant is between a minimum and maximum allowable percentage of denaturant for a final biofuel product produced by the biofuel production process, wherein the instructions for determining the optimal blending percentage of the denaturant comprise:

instructions for deriving measurements from process instruments of the biofuel production process, utilizing inferential models of the biofuel production process, using laboratory values relating to operating variables of the biofuel production process and obtained from the biofuel production process, or a combination thereof, wherein the derived measurements, information from the inferential models, and the laboratory values comprise process information relating to the biofuel production process including equipment settings, temperatures, pressures, flow rates, material properties, ambient conditions, or a combination thereof; and instructions for executing linear or nonlinear prediction models, using the prices of the denaturant and the undenatured biofuel and the derived measurements, information from the inferential models, or the laboratory values as inputs, to obtain an overall optimization objective subject to dynamic constraints, wherein the overall optimization objective specifies the optimal blending percentage of the denaturant; and instructions for controlling the blending of the denaturant with the undenatured biofuel based upon the determined optimal blending percentage of the denaturant.

13. The process controller of claim 12, wherein the code comprises instructions for controlling operating parameters of the biofuel production process related to a molecular sieve based upon the determined optimal blending percentage of the denaturant to reduce an amount of water in the final biofuel product, wherein the molecular sieve removes moisture content from the undenatured biofuel prior to the blending of the denaturant with the undenatured biofuel, and wherein the operating parameters of the molecular sieve comprise flow rates of the undenatured biofuel into the molecular sieve, pressure in the molecular sieve, temperature or flow rates of steam used within the molecular sieve, or a combination thereof.

14. The process controller of claim 12, wherein the code comprises instructions for determining the optimal blending percentage of the denaturant to be blended with the undenatured biofuel based upon operating variables of distillation units of the biofuel production process.

15. The process controller of claim 12, wherein the instructions are cyclically repeated during operation of the biofuel production process.

* * * * *